W. S. SOUTHWICK.
INTERPOSED FABRIC MACHINE.
APPLICATION FILED APR. 22, 1918.
1,351,350.
Patented Aug. 31, 1920.
13 SHEETS—SHEET 1.
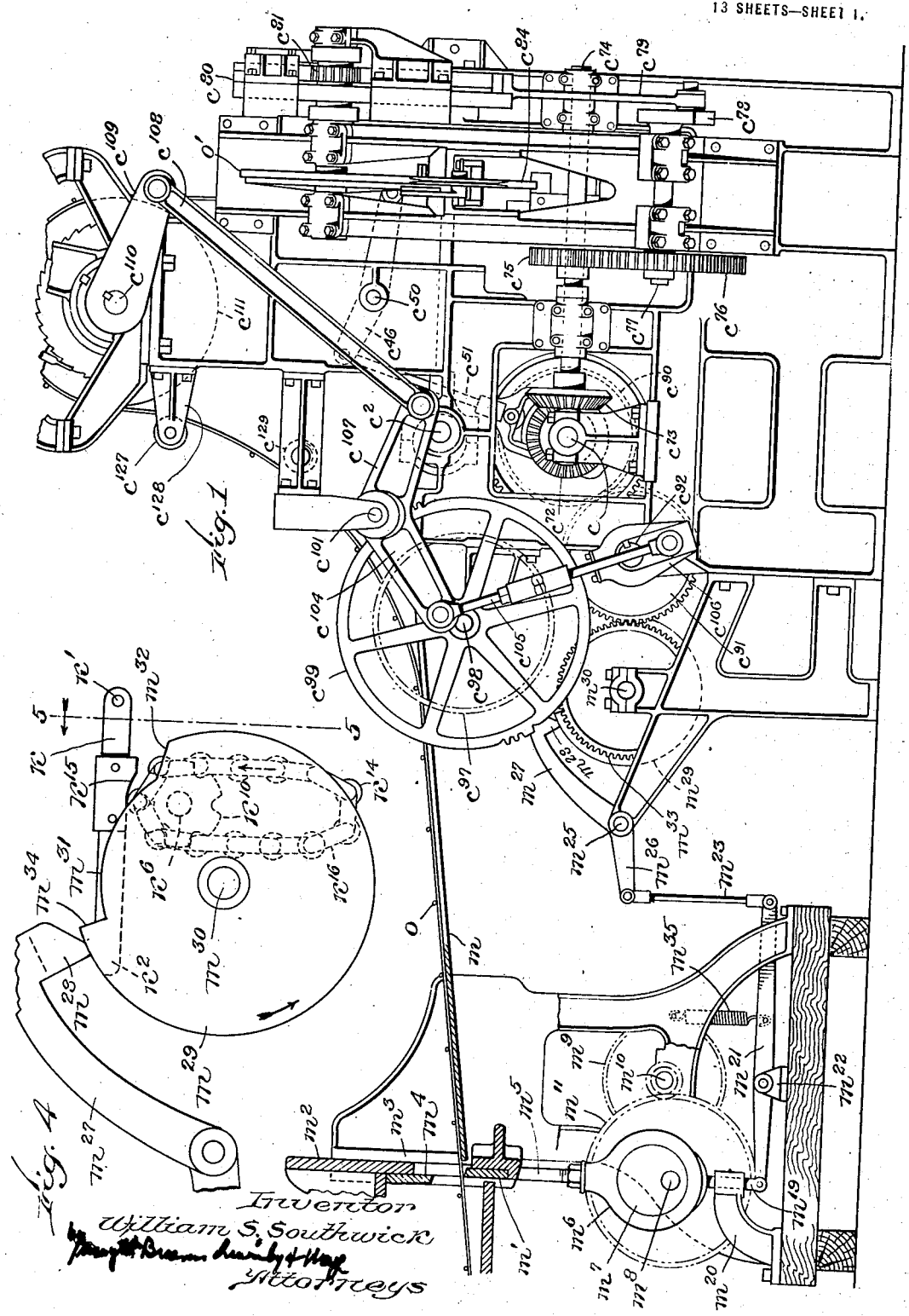

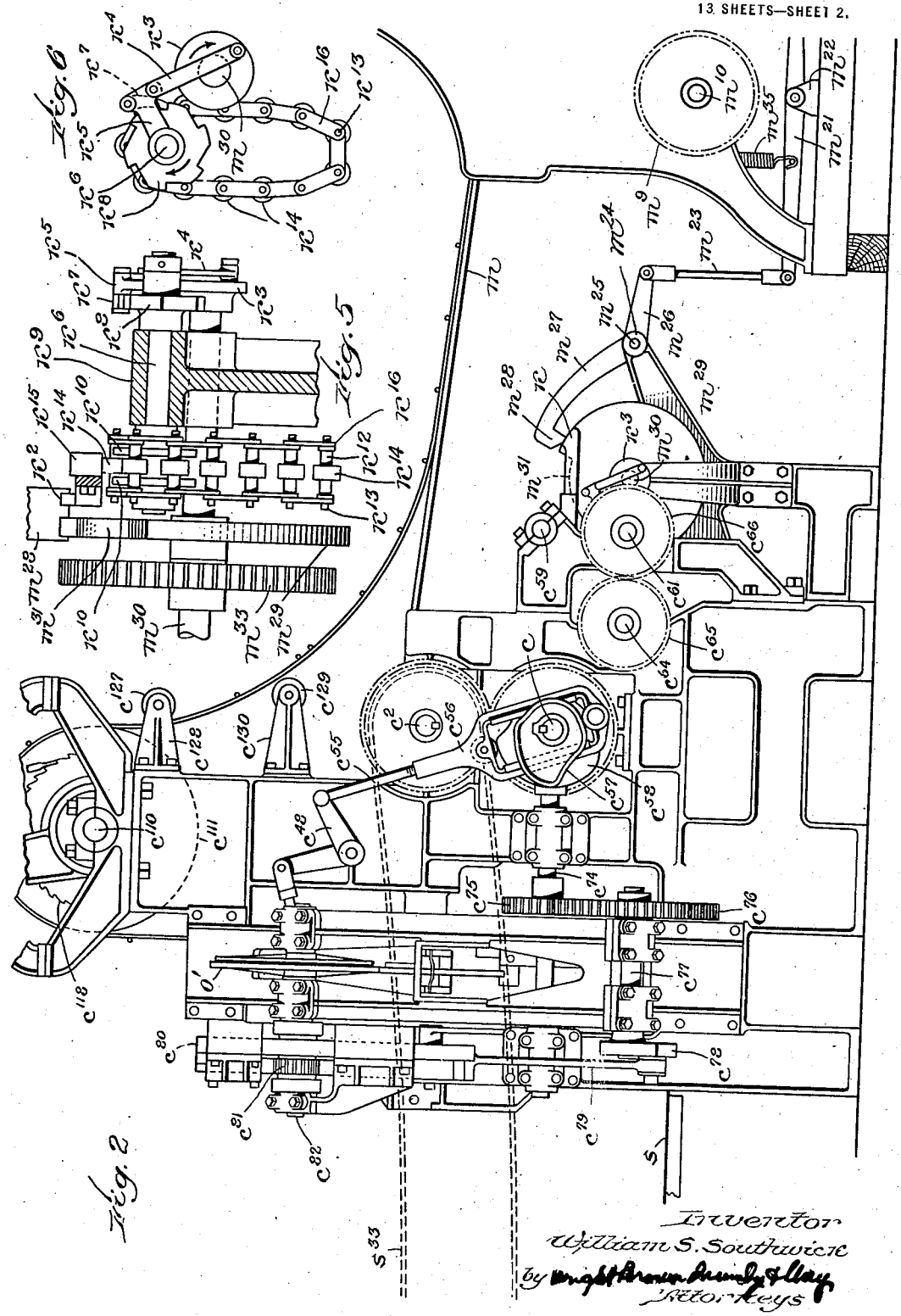
W. S. SOUTHWICK.
INTERPOSED FABRIC MACHINE.
APPLICATION FILED APR. 22, 1918.
1,351,350.
Patented Aug. 31, 1920.
13 SHEETS—SHEET 2.
Inventor
William S. Southwick
by Wright Brown Quinby & May
Attorneys

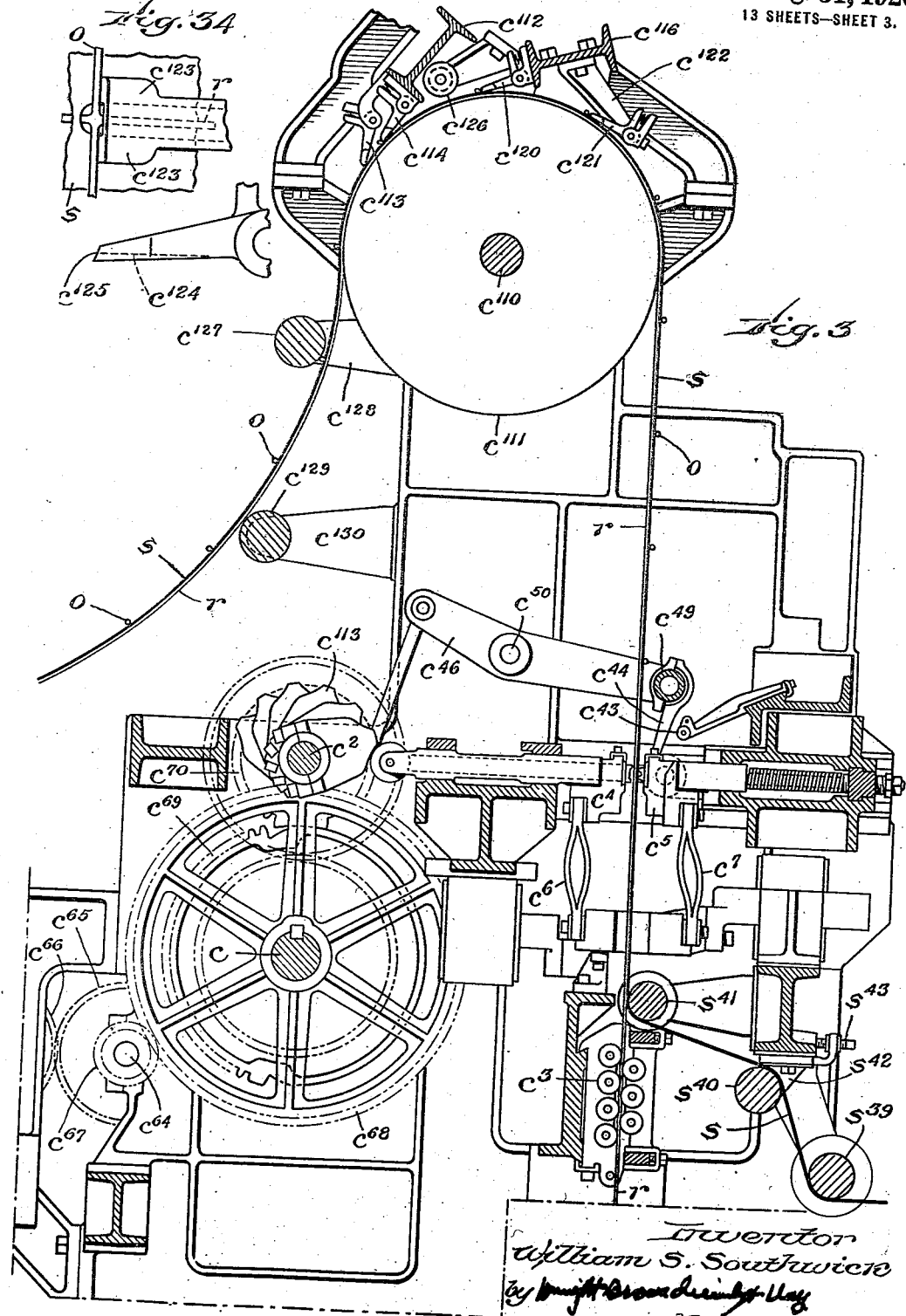

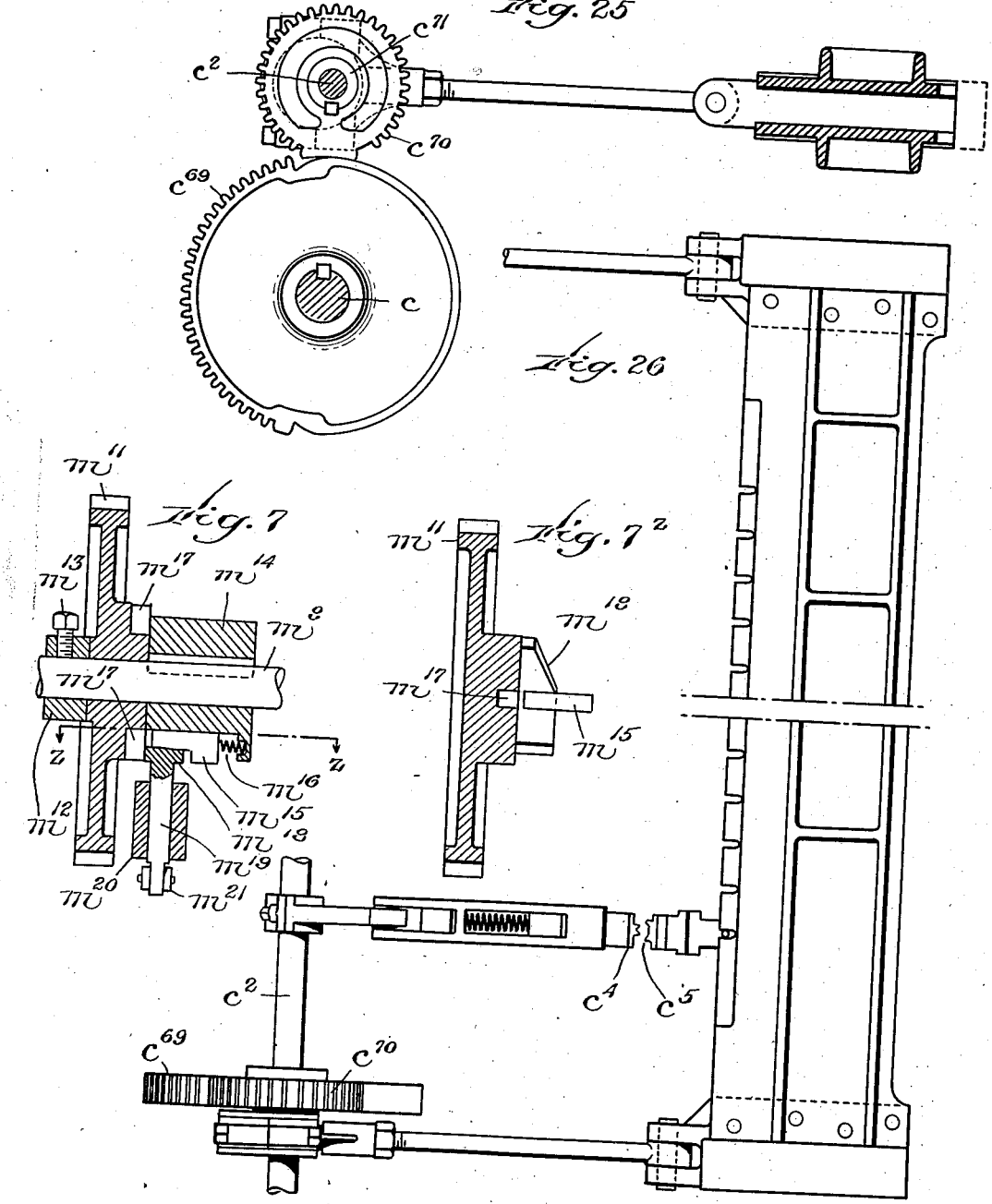

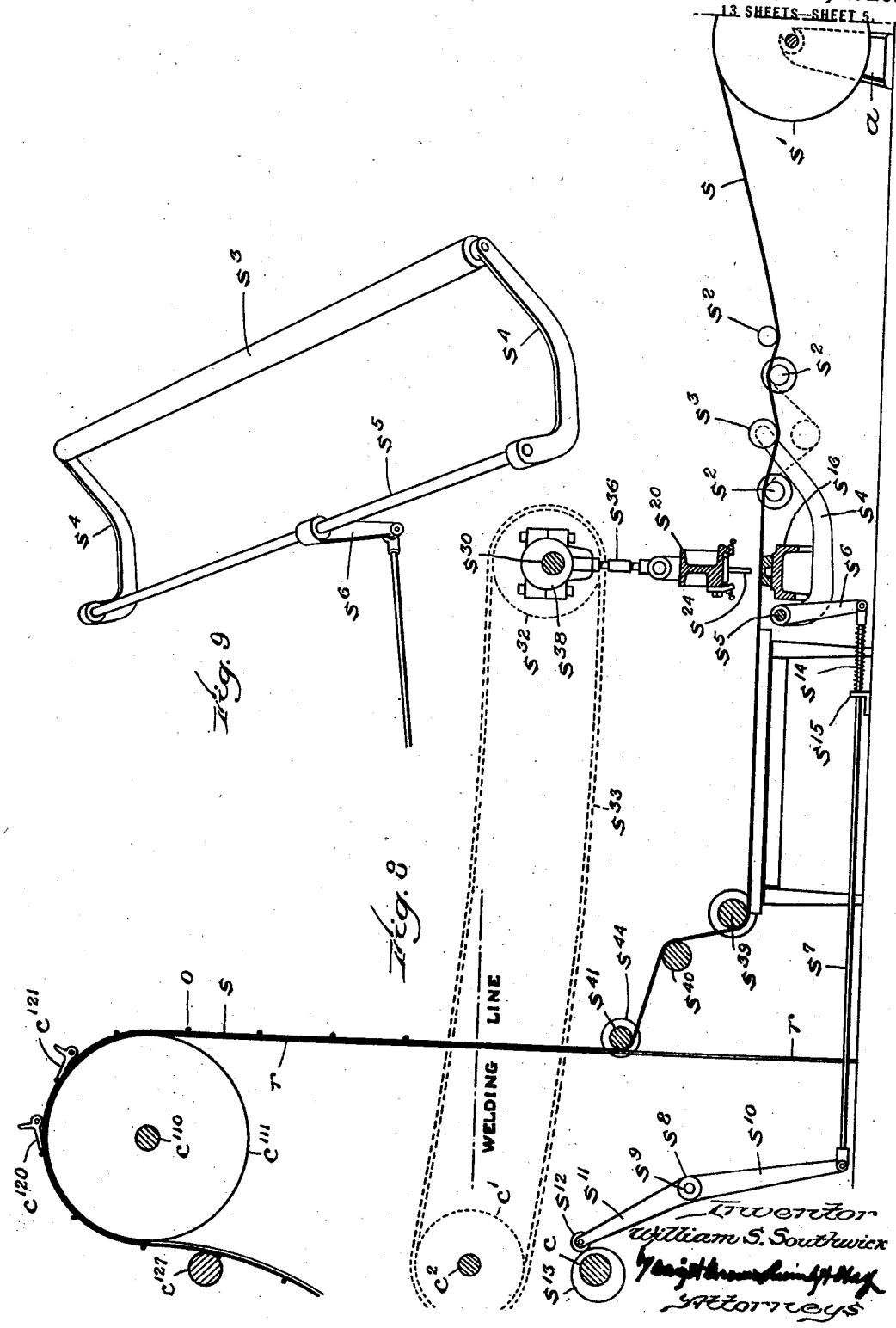

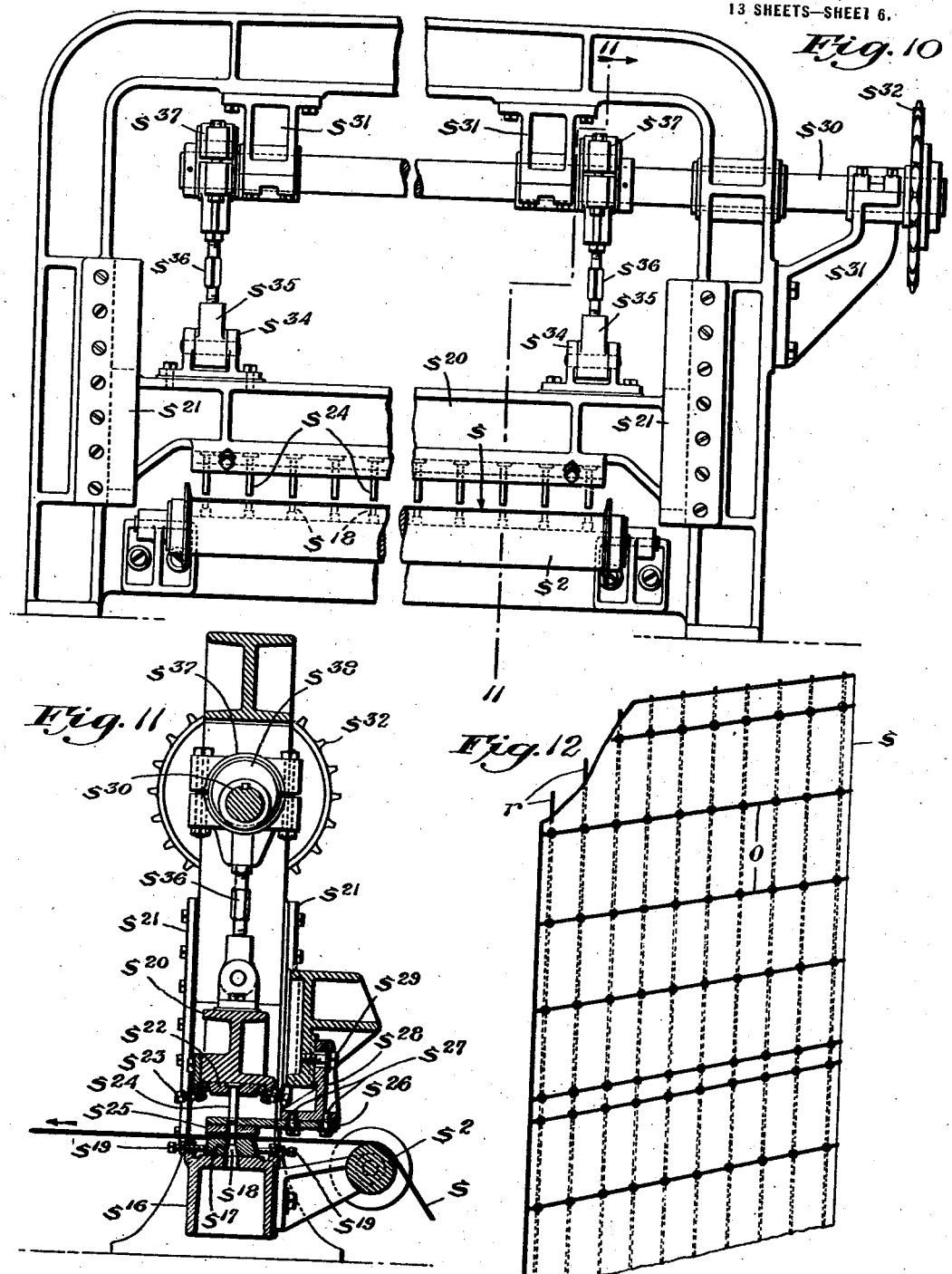

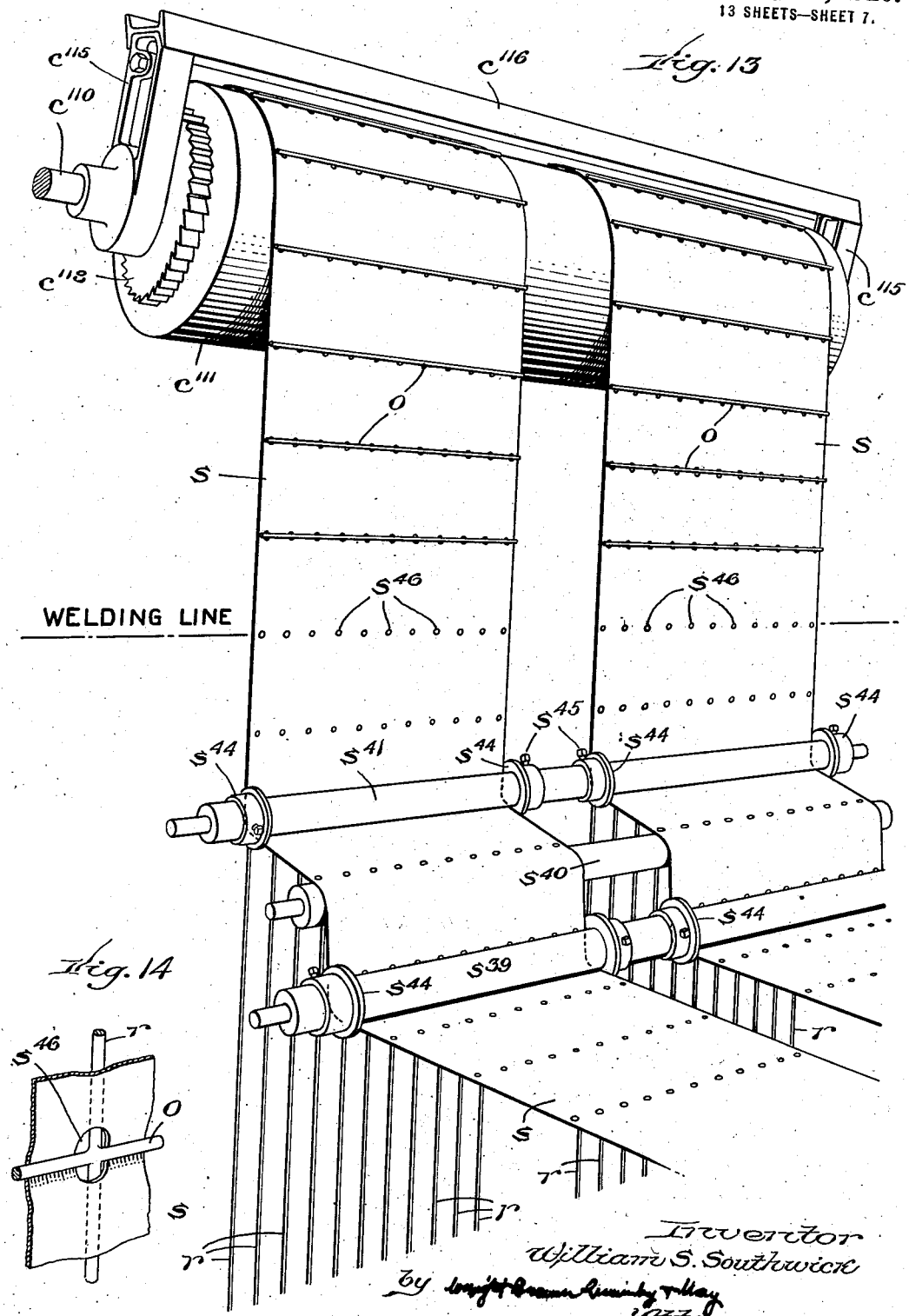

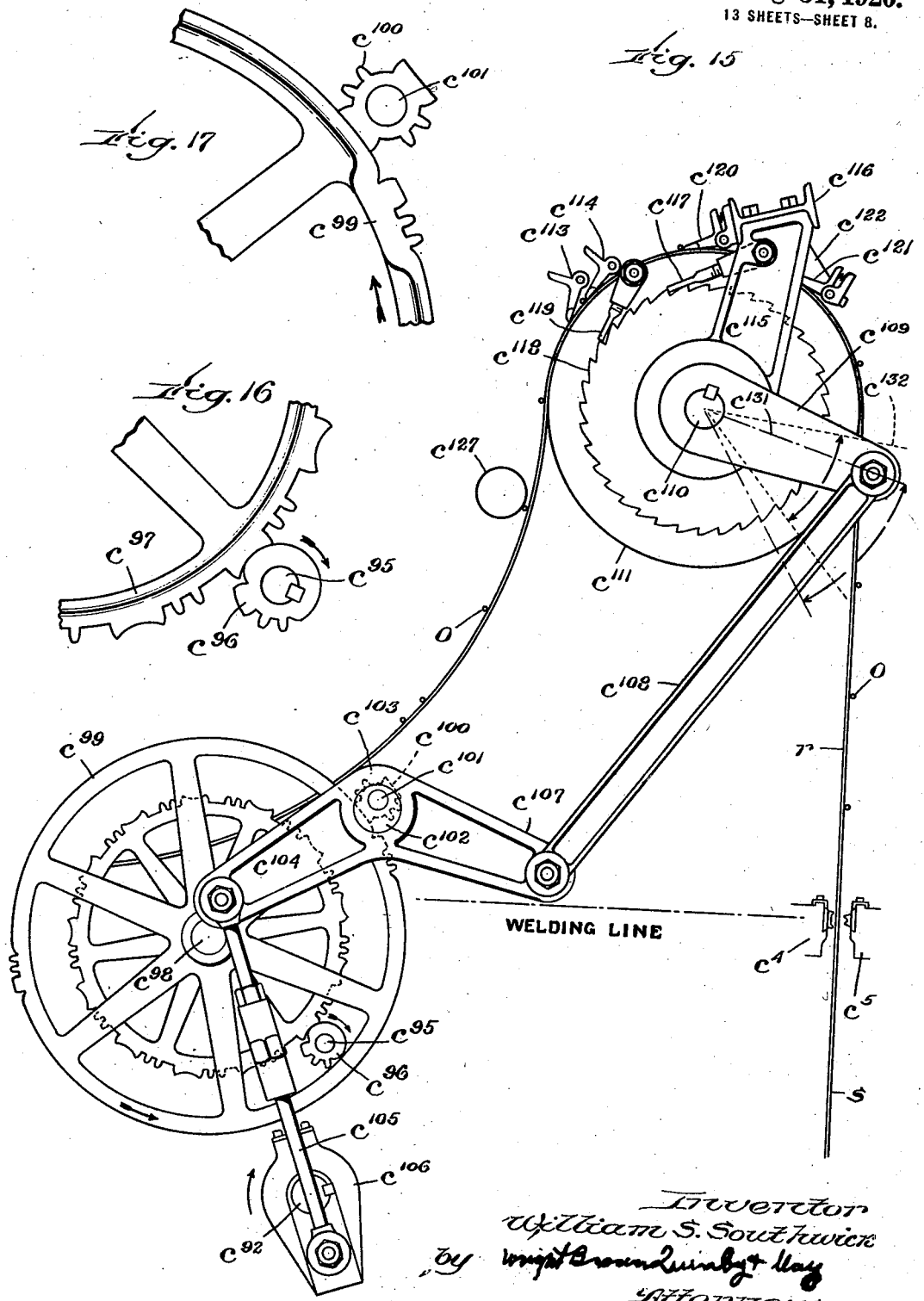

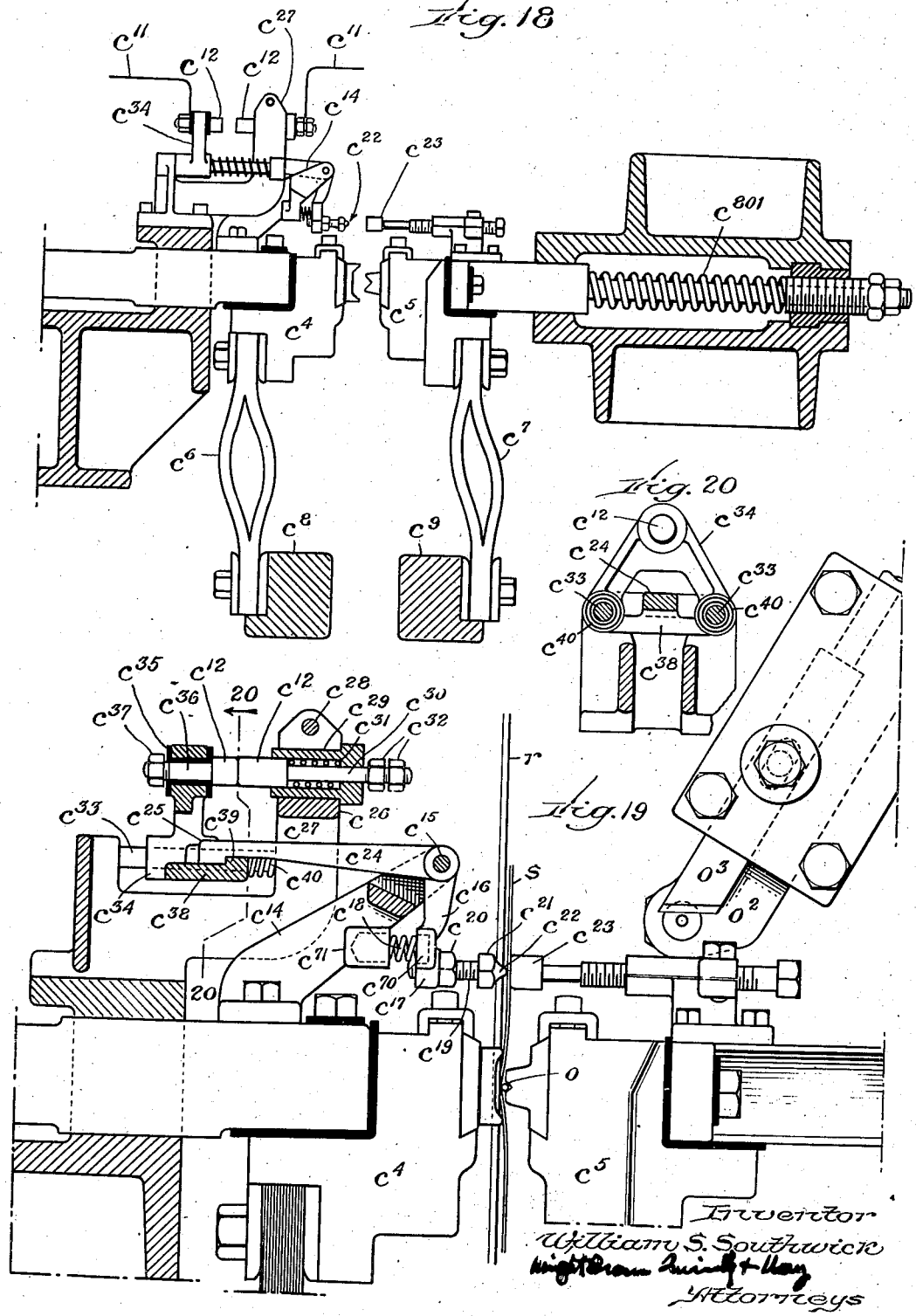

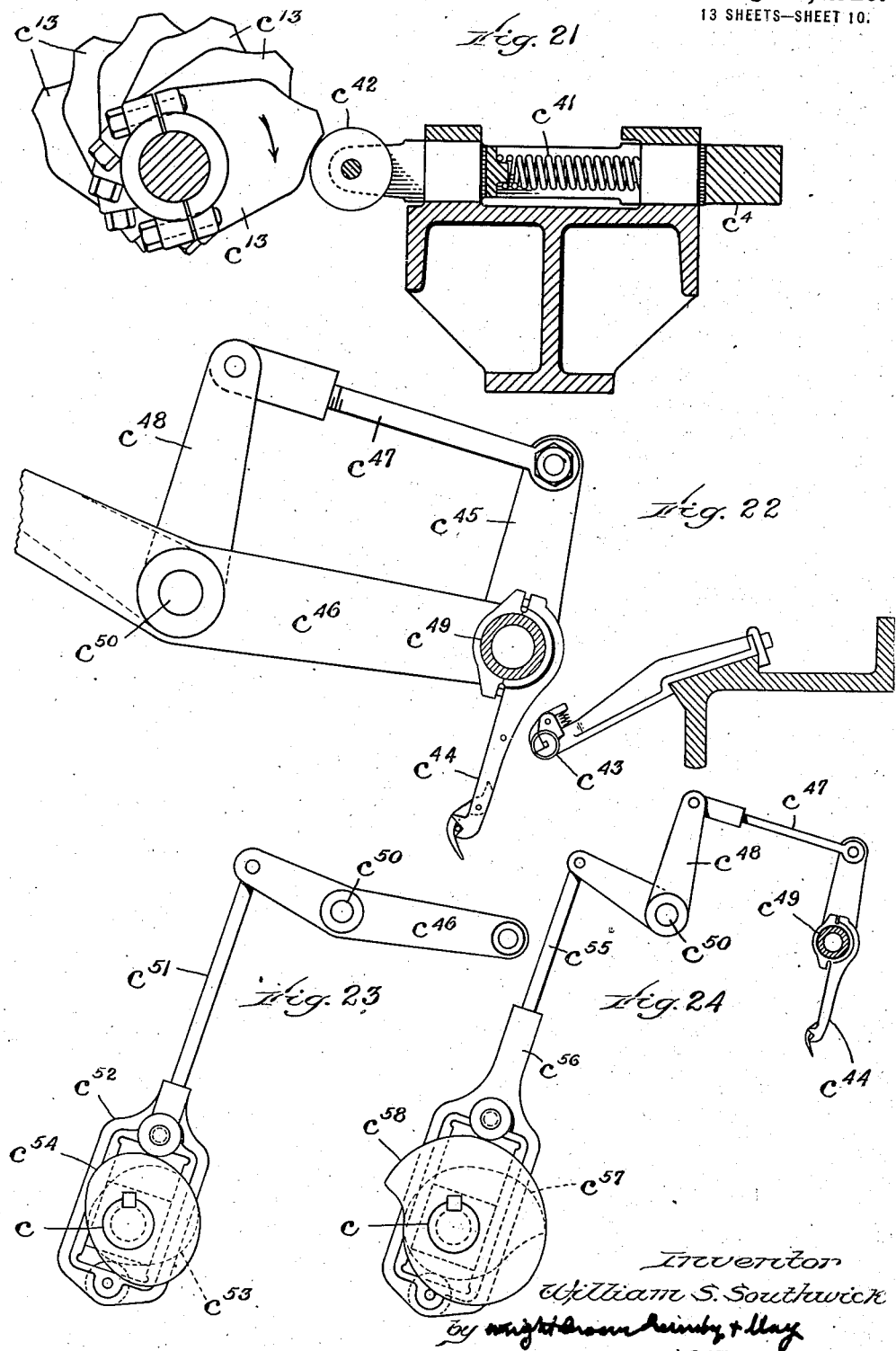

W. S. SOUTHWICK.
INTERPOSED FABRIC MACHINE.
APPLICATION FILED APR. 22, 1918.
1,351,350.
Patented Aug. 31, 1920.
13 SHEETS—SHEET 11.
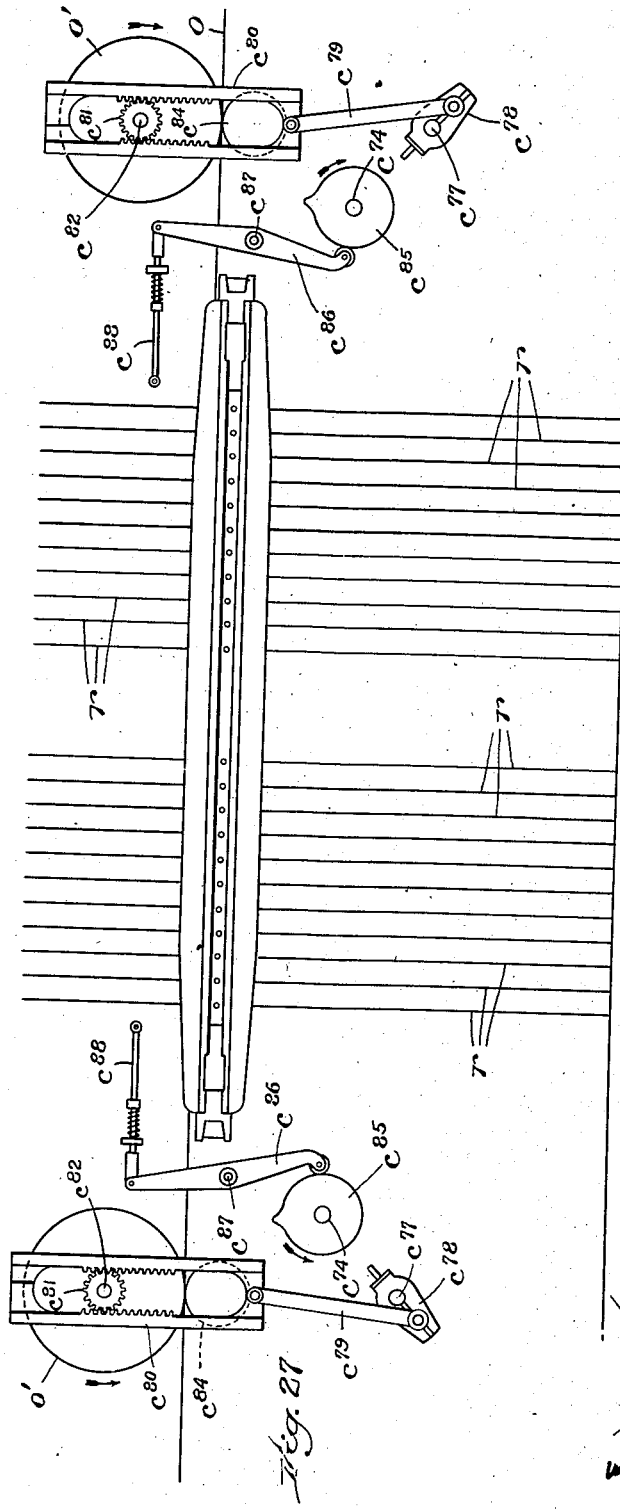
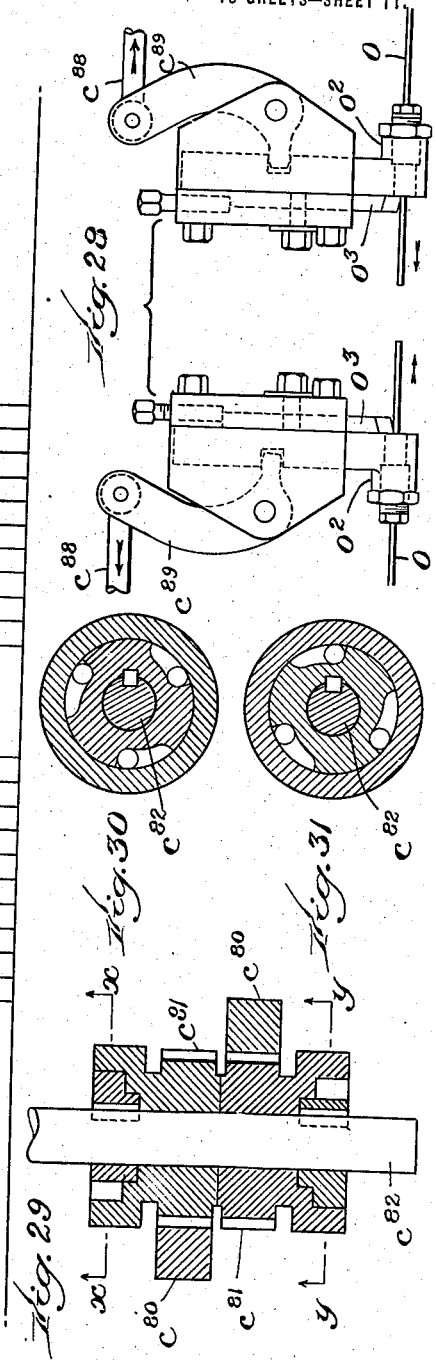
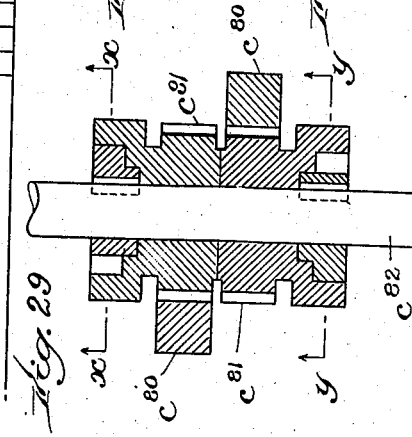
Inventor
William S. Southwick
Attorneys

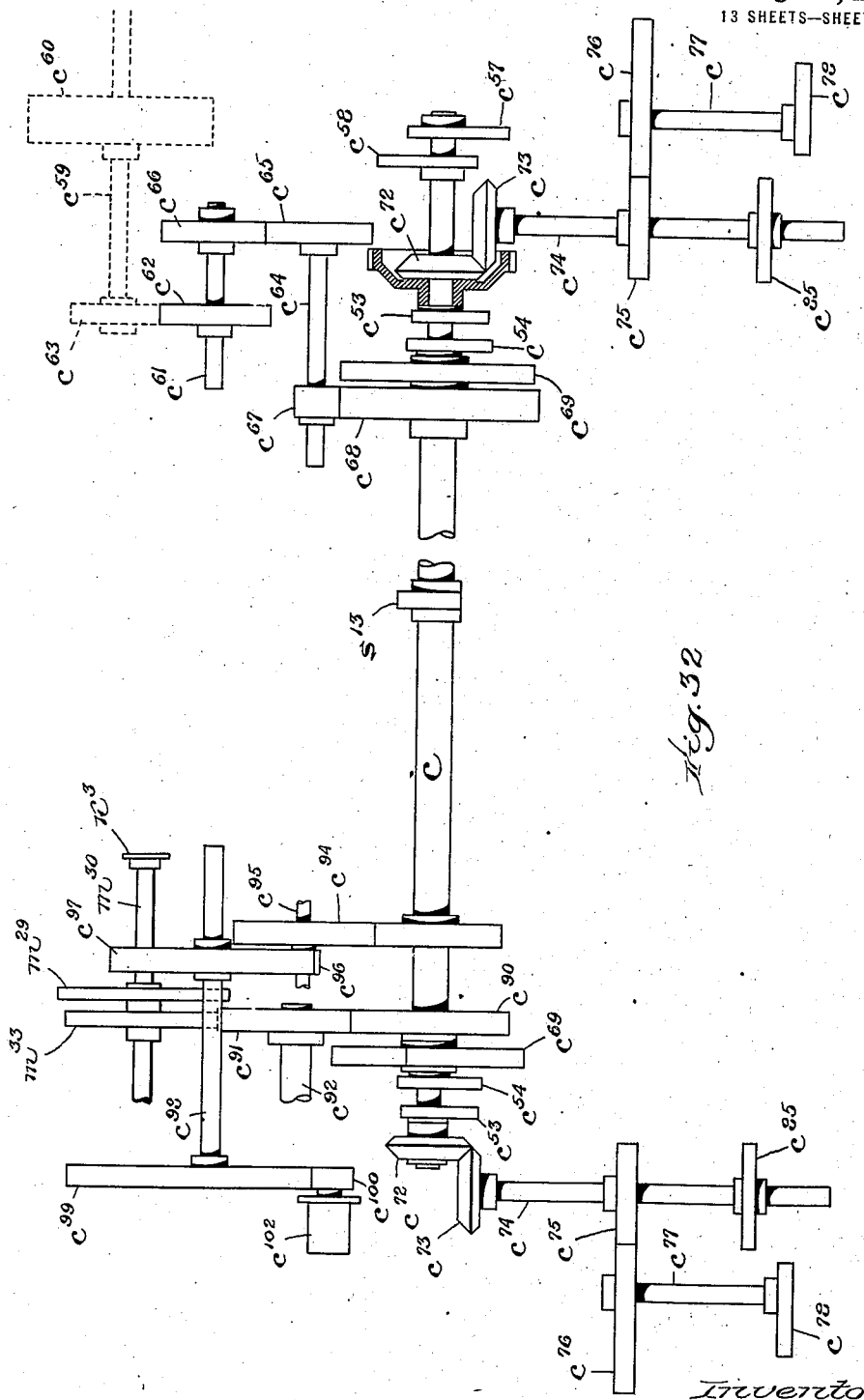

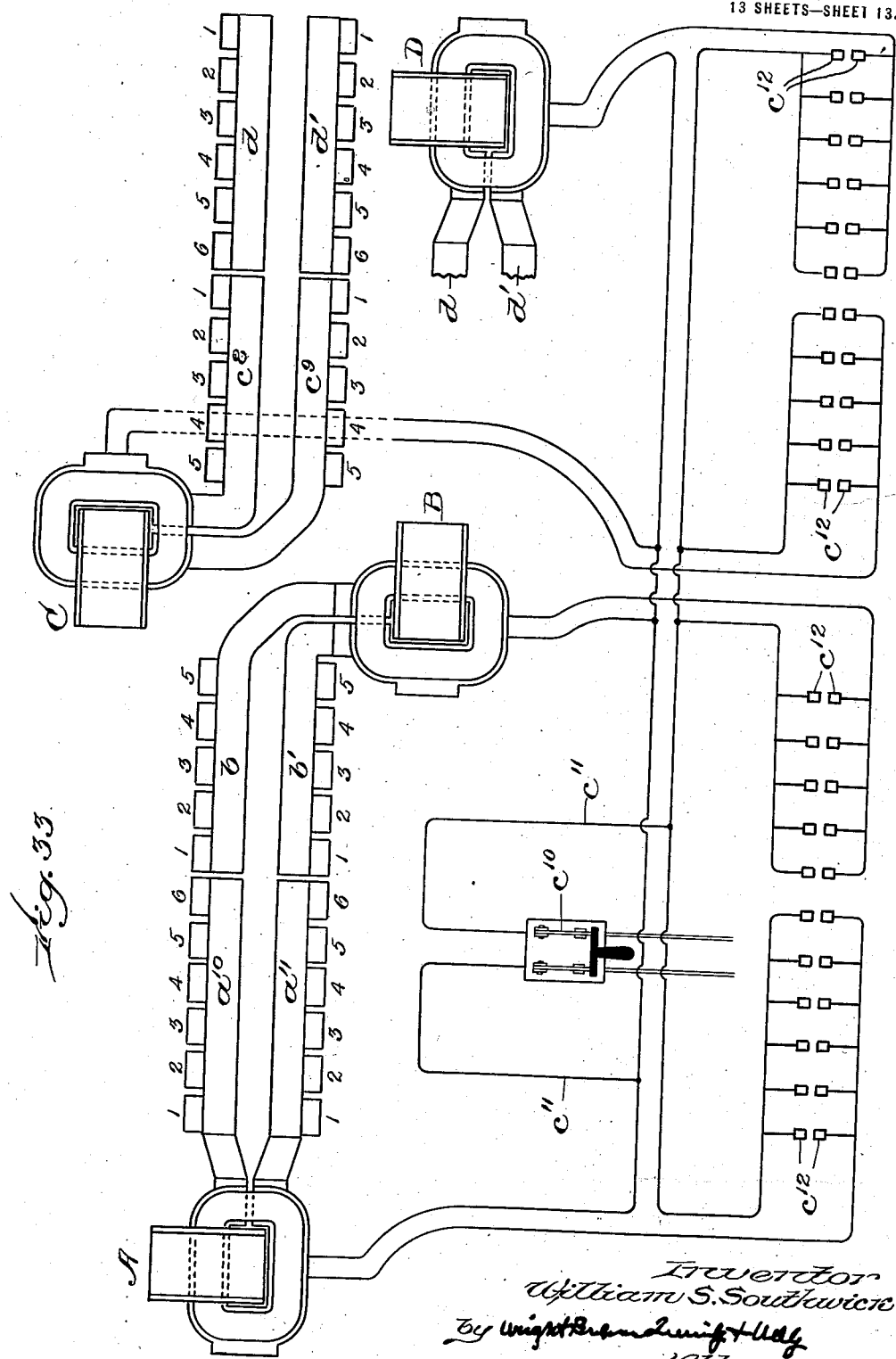

UNITED STATES PATENT OFFICE.

WILLIAM S. SOUTHWICK, OF CLINTON, MASSACHUSETTS, ASSIGNOR, BY MESNE ASSIGNMENTS, TO WICKWIRE SPENCER STEEL CORPORATION, A CORPORATION OF MASSACHUSETTS.

INTERPOSED-FABRIC MACHINE.

1,351,350.

Specification of Letters Patent.   Patented Aug. 31, 1920.

Application filed April 22, 1918.   Serial No. 230,027.

*To all whom it may concern:*

Be it known that I, WILLIAM S. SOUTHWICK, a citizen of the United States, residing at Clinton, in the county of Worcester and State of Massachusetts, have invented new and useful Improvements in Interposed-Fabric Machines, of which the following is a specification.

This invention relates to an improved machine for making interposed fabric, that is, sheets of perforated tar paper or similar material having longitudinal wires, rods or members arranged on one side and cross wires, rods or members arranged on the opposite side, said wires or members being electrically welded at their points of intersection through the perforations in the sheet material.

In the drawings like characters indicate like parts wherever they occur.

Figure 1 represents a left side elevation of the machine constructed in accordance with my invention, the perforating mechanism at the front of the machine or at the right in this figure being omitted;

Fig. 2 is a right side elevation of the machine shown in Fig. 1;

Fig. 3 is a vertical, longitudinal, sectional view of the machine through one of the welding units in a plane from front to rear;

Fig. 4 is a detail view of the mechanism for controlling the shears that sever the fabric, said mechanism being included in Fig. 1, but on a smaller scale;

Fig. 5 is a view of the part included in Fig. 4 as seen from the point indicated by the line 5—5 of Fig. 4;

Fig. 6 is an elevation of the ratchet and chain mechanism shown in Fig. 5, the direction of this view being the same as that of Fig. 2;

Fig. 7 is a vertical sectional view of the clutch for operating the shear shown at the left in Fig. 1;

Fig. 7ᶻ is a sectional view on the line z—z of Fig. 7, looking in the direction of the arrow;

Fig. 8 is a vertical longitudinal sectional view of the machine as shown in Fig. 1, parts of the mechanisms being omitted in order to show the position of the parts of the fabric before welding, at the time of welding, after welding, and also the end of the drum with the coöperating pawls that feed the fabric;

Fig. 9 is a view of the auxiliary feed roll at the right of the punching table in Fig. 8;

Fig. 10 is a front elevation of the punching mechanism shown in Fig. 8, the middle portion being broken out in the illustration for economy of space;

Fig. 11 is a vertical cross sectional view on the line 11—11 of Fig. 10, looking in the direction of the arrow;

Fig. 12 is a detail perspective view of the product of the machine showing the fabric body and the reinforcing members upon either side thereof welded together through perforations in the fabric;

Fig. 13 is a detail perspective view taken at the end of Fig. 8, showing the feed drum for pulling the parts of the fabric into position to be welded and thereafter pushing the completed fabric to a table, not shown, in proper position for the shearing operation; the point at which the welding operation takes place is indicated by a line marked "welding line;"

Fig. 14 is a detail perspective view of the portion of the completed fabric showing the sheet material provided with a perforation, the two reinforcing metallic members welded together through said perforation;

Fig. 15 is an end elevation of the mechanism for operating the feed drum shown in Fig. 13 in perspective, shown in end elevation in Fig. 8, and shown in elevation in Fig. 1; this Fig. 15 showing the completed fabric being fed through and out of the machine, and the position of the welding jaws in relation to the fabric;

Fig. 16 is a detail view of the two inside gears shown at the lower part of Fig. 15, the driving gear of the two rotating in the direction of the arrow;

Fig. 17 is a detail view of the two outside gears at the lower part of Fig. 15, the operation of the smaller of which serves to shift the fulcrum of a bell-crank lever that is a part of the means for operating the feed drum, the bell-crank lever itself being operated by a crank directly connected to the shaft shown at the bottom of Fig. 15;

Fig. 18 is a detail view of the welding mechanism shown in Fig. 3 illustrating the connection of the welding jaws, the terminals of the transformer, also showing the switches for closing and opening the primary circuit, the jaws being shown open in this figure;

Fig. 19 is a view similar to Fig. 18, but showing the jaws closed with the parts to be welded in position between the jaws, the primary circuit switch being shown as closed, the parts being in the position occupied during the welding operation, the cross stay wire cutter appearing at the right-hand side of this figure in the position occupied in the machine;

Fig. 20 is a detail view of the bracket carrying a part of the primary circuit closing mechanism taken on the line 20—20 of Fig. 19, looking in the direction of the arrow;

Fig. 21 is a detail view of the means for operating the rear welding jaw, the cam shaft and frame for supporting the plunger of the rear welding jaw being shown in section;

Fig. 22 is a detail view of the means for holding the stay wire, so-called, and means for transferring the stay wire to the position for welding;

Fig. 23 is a detail view of the mechanism for giving to the stay wire transfer arm of Fig. 22 one of its movements, to wit, the up and down movement;

Fig. 24 is a detail view of the mechanism for giving the transfer arm shown in Fig. 22 its front and rear movement; the combined motions referred to in this figure and the prior figure give to the transfer arm its feeding motion from the stay wire receiver to the welding jaw;

Fig. 25 is a detail view of the mechanism for reciprocating the plunger of the front welding jaws;

Fig. 26 is a top plan view of the mechanism shown in Fig. 25, illustrating one of the series of pairs of welding jaws;

Fig. 27 is a front elevation of the machine shown in Fig. 3, illustrating the girt carrying the front welding jaws, two sets of longitudinal or strand wires, and on each side part of the means for feeding a stay wire, and a part of the means for operating the stay wire cutter;

Fig. 28 is a detail view of the two stay wire cutters employed in connection with the mechanism shown in Fig. 27, there being one of said cutters arranged on each side of the machine; the bracket in this view being merely to include both cutters in one figure, the two cutters being respectively right and left-hand cutters;

Fig. 29 is a detail view of the shaft friction feed and gears employed for operating the stay wire feed;

Fig. 30 is a cross sectional view on the line $x$—$x$ of Fig. 29;

Fig. 31 is a cross sectional view on the line $y$—$y$ of Fig. 29;

Fig. 32 is a plan view of a part of the shafting and gearing in the machine in order to show the connection of the driving mechanism, the other parts of the machine being omitted for the sake of clearness;

Fig. 33 is a plan view of the primary circuits and their connections, the secondary circuits and their connections, the transformer at the right-hand end of the figure being broken away from its bus bar and placed down out of its proper position to save space in the drawing. It should occupy the relative position at the right of Fig. 33 that is occupied by the transformer at the left of Fig. 33;

Fig. 34 is a detail view of the operating end of one of the fabric feed pawls.

It is well known in the art that an alternating current must be employed in the primary and an alternating current is induced in the secondary of the transformer. Since this is a well-known feature, I shall in my description of the circuits refer to the passage of the current in one direction only, it being understood that an alternating current is employed and that the direction of the current would be reversed at each alternation.

In this machine a sheet of fabrics of any desired material such as tar paper, asbestos or wire is fed between strand wires $r$ and cross or stay wires $o$. The stay wires $o$ are electrically welded to the strand wires $r$ through suitable openings in the fabric $s$, see Fig. 3. In this general particular this machine resembles the machine shown in prior patent to Perry, #814,393, and prior patent to Smith, #830,018.

Fig. 1, in side elevation, shows the main part of the machine for feeding and welding and also for cutting up any fabric into desired lengths. This figure does not show the instrumentalities for punching holes in the fabric $s$ prior to the latter's being fed in between the strand wires $r$ and the stay wires $o$. This punching mechanism, however, is shown in Fig. 8. Figs. 1 and 8 show the complete cycle of operations; the punching mechanism, or mechanism of Fig. 8, being important only when it is necessary to form the fabric with holes.

Fig. 3 is a vertical longitudinal sectional view of the central part of Fig. 1.

Considering Figs. 1, 3 and 8 together a complete view of the entire machine is readily secured. The fabric $s$ is fed into the machine from a roll $s'$ supported on suitable standards $a$ of the framework. As the fabric leaves the roll $s'$, it passes between stationary rolls $s^2$ and a movable compensating roll $s^3$, Fig. 9. The rolls $s^2$ are loosely mounted in suitable bearings, not shown. The ends of the roll $s^3$ are carried in arms $s^4$ which at their rear ends are fast on a shaft $s^5$ loosely mounted in bearings in the framework.

$s^6$ represents a crank arm one end of which is rigidly secured to the shaft $s^5$. The free end of the crank arm $s^6$ is connected to a pitman $s^7$. $s^8$ represents a hub loosely mounted on a pin $s^9$ carried by the framework. $s^{10}$ represents an arm carried by the hub $s^8$ and connected at its free end to the pitman $s^7$. $s^{11}$ represents an arm also carried by the hub $s^8$ provided at its free end with a roller $s^{12}$ adapted to engage the periphery of the cam $s^{13}$ rigidly mounted on a shaft $c$, the main drive shaft of the machine. $s^{14}$ represents a coil spring arranged on the pitman $s^7$ between its connection with the crank $s^6$ and a collar $s^{15}$ secured to the framework. This spring is so arranged as to maintain the cam roller $s^{12}$ against the cam $s^{13}$ at all times.

$s^{16}$ represents the bed of the punch, which, in this case is one of the cross girts of the frame of the machine. Upon the top of the bed $s^{16}$ is arranged a die $s^{17}$, Figs. 8, 10, and 11, formed with a series of holes $s^{18}$. Adjusting screws $s^{19}$ serve to position the die $s^{17}$ in the desired position of the machine, lengthwise of the machine, and also the desired position crosswise of the machine.

$s^{20}$ represents a sliding head held and guided at its ends in ways $s^{21}$ in the side frames of the machine. To the lower face of the sliding head $s^{20}$ is adjustably secured a punch holder $s^{22}$ by means of screws $s^{23}$. By means of this construction the punch holder $s^{22}$ can be adjusted sidewise and lengthwise of the machine to any desired point in order to bring its punches $s^{24}$ in position to register with the holes $s^{18}$ in the die $s^{17}$.

$s^{25}$ represents a stripper plate carried by arms $s^{26}$. $s^{27}$ represents cap screws securing the arms $s^{26}$ to brackets $s^{28}$. These brackets $s^{28}$ are formed with slots which by means of cap screws $s^{29}$ are adjustably secured to a girt $a$ of the frame work of the machine. By the described construction of the stripper plate $s^{25}$ can be adjusted to register with the dies $s^{24}$ and the holes $s^{18}$ in the die plate, but so arranged that the fabric $s$ passes through the punch between the die plate $s^{17}$ and the stripper plate $s^{25}$ as shown in Fig. 11.

$s^{30}$ represents a shaft mounted in suitable bearings carried by brackets $s^{31}$. To the outer end of this shaft $s^{30}$ is secured a sprocket wheel $s^{32}$. $s^{33}$ represents a sprocket chain mounted upon the sprocket wheel $s^{32}$ and at its opposite end upon a sprocket wheel $c^1$, rigidly mounted on a shaft $c^2$ that in turn is driven by the main shaft $c$. $s^{34}$ represents brackets secured to the top of the sliding head $s^{20}$. $s^{35}$ represents a lug pivoted at its lower end to the bracket $s^{34}$ and fitted at its upper end with a screw-threaded end of a connecting rod $s^{36}$. The upper end of this connecting rod $s^{36}$ is connected to an eccentric strap $s^{37}$ mounted on an eccentric $s^{38}$ which in turn is rigidly mounted on the shaft $s^{30}$.

In the drawings there are two connecting rods $s^{36}$ and their connections are shown, one at each end of the sliding head $s^{20}$. By the described construction the sliding head $s^{20}$ and the punches $s^{24}$ are given a reciprocating motion timed with relation to the other working units of the machine. Further, the punches $s^{24}$, see Fig. 8, are positioned with relation to the welding line or the point where the stay wires are welded to the longitudinal wires in such position that the holes made by the punches $s^{24}$ will register with the point of contact between the cross wires and the longitudinal wires so that the weld can be made through the holes in the fabric $s$.

During the welding operation the feeding mechanism for the fabric and the stay wire is stationary. At this time the punch is operated. Further, the parts are so timed that simultaneous with the operation of the punches $s^{24}$ the roll $s^3$ is depressed to the dotted-line position in Fig. 8. The amount of movement of the roll $s^3$ is regulated so that it can take up and draw from the roll $s^1$ the length of fabric corresponding to the speed of the feeding mechanism for the fabric and strand wire. At the conclusion of the punching and welding operation and the resumption of the feeding of the strand members and the fabric, the roll $s^3$ rises to release the fabric pulled off from the roll $s^1$ gradually and under tension. By this provision the yanking on the roll $s^1$ and the consequent tearing or stretching of the material of the fabric is prevented. Further, this roll $s^3$ assists in keeping the tension on the fabric sheet $s$ uniform. After the fabric leaves the punches it passes about a series of rolls $s^{39}$, $s^{40}$, $s^{41}$. The rolls $s^{39}$ and $s^{41}$ have their ends loosely mounted in bearings in the framework of the machine. The roll $s^{40}$ is loosely mounted in bearings at the end of a bracket $s^{42}$ that by means of a set screw $s^{43}$ can be adjusted in or out in order to increase or decrease the distance the fabric sheet must travel from the roll $s^{39}$ to the roll $s^{41}$. By these means I am able to secure at the welding line the proper positioning of the holes $s^{46}$ in the fabric $s$ made by the punches $s^{24}$.

The roll $s^{40}$ could be adjusted to the left in Fig. 3 to permit more travel of the fabric when the holes in the fabric did not feed far enough to register with the welding line. On the other hand, by adjusting the roll $s^{40}$ to the right in Fig. 3 in cases when the holes in the fabric feed past the welding line, said holes may be positioned on the welding line.

As shown in Fig. 13, there are two fabric strips $s$. There are also two fabric rolls $s^1$ and two rolls $s^2$. Upon each of the rolls $s^2$, $s^{39}$ and $s^{41}$ is shown two sets of adjustable collars $s^{44}$, see Fig. 13. These collars are secured to their respective shafts by set-screws $s^{45}$. By means of these collars which act as guides for the fabric $s$, the latter can be properly guided on each side of the punch in order to have the holes uniformly punched at the desired angle to the line of feed of the fabric. Further, the collars $s^{44}$ serve to keep the fabric properly positioned for passage between the welding jaws and to the feeding mechanism beyond the welding jaws hereafter described.

The means for welding together the strand and stay wires through the holes $s^{46}$, as shown in detail in Fig. 14, are substantially the same as those shown in the Smith Patent #830,018 and need no particular description because not new with me and here shown only as a part of my present machine. Such welding mechanism in general, referring to Fig. 3, comprises grooved rolls $c^3$ between which the strand wires are drawn which serve to straighten the strand wires and hold the latter under tension and in alinement with the pair of welding jaws corresponding to that particular strand wire. Such rolls are old (see for illustration patent to Perry 814,392, Fig. 1, part designated 7 and specification page 2) and therefore require no detailed description.

The front and rear welding jaws $c^4$, $c^5$, their mounting, arrangement, and means for operating, are substantially those shown in Smith patent.

The wheel $c^1$ for feeding the stay wire $o$ and the mechanism for driving and controlling the operation of said stay wire feed wheel is the same as shown in the Smith patent. In this application however instead of using one stay wire feed and having the stay wire clear across the machine, I employ two stay wire feeds, one at each side of the machine and feed the stay wire from each side of the machine across the width of the fabric $s$. This results in increasing the speed of the machine. The two stay wire feeds are shown in Fig. 27. In the Smith patent the stay wire is fed by the wheels $o^1$ from a coil of wire and cut off at the right length by stay wire cutters $o^2$, Fig. 28. In the Smith machine but one stay wire cutter is employed, whereas in this machine I employ two stay wire cutters, one on each side of the machine corresponding to the two stay wire feeds $o^1$. The mechanism for operating each of the cutters $o^2$ at the proper time is the same as that employed in the Smith patent. As shown in Fig. 28 and as in the Smith patent, the cutting knife $o^3$ is stationary, a stay wire being drawn against the knife by a thimble through which the wire passes.

Referring to Fig. 3, there will be as many pairs of welding jaws $c^4$, $c^5$ as there are strand wires and they will be properly positioned on their respective girts and connected by leads $c^6$, $c^7$, which in turn are connected to the transformer as in the Smith patent.

In the Smith machine there are two pairs of bus bars which extend halfway across the machine and each pair connected to the transformer. In this type of welding it is essential to make the welds in succession. By the Smith construction two welds can be made simultaneously on the opposite side of the machine although each of such welds is in sequence so far as its own division is concerned. I carry this process one step farther and provide four pairs of bus bars each suitably connected to the transformer as shown in plan in Fig. 33. By this construction I double the welding speed of the Smith machine making four welds simultaneously, although each one of said welds is in sequence so far as the welds in its own set is concerned.

The transformers, see Fig. 33, are indicated by the letters A B C D, and their respective bus bars are indicated by the letters $a^{10}$, $a^{11}$ respectively, $b$, $b^1$ respectively, $c^8$, $c^9$ respectively, $d$, $d^1$ respectively. The leads $c^6$, $c^7$, of Fig. 3, are indicated in Fig. 33 in sequence for each pair of bus bars by the symbols 1, 2, 3, 4, 5, 6 for the outside bus bars, and the symbols 1, 2, 3, 4, 5 for the inside bus bars.

A switch $c^{10}$ is used to connect the source of power and the primary circuit $c^{11}$ of the transformers. $c^{12}$ represents switches closing the primary circuit. There is one pair of these switches for each welding jaw. These switches are controlled by the cams $c^{13}$, Fig. 3, that operate the plunger of the rear welding jaw.

The particular construction of the switch I employ differs from that shown in the Smith patent and is illustrated in detail in Figs. 18, 19, 20, the contacts or switches shown in those views being indicated by the symbol $c^{12}$. Upon the plunger that carries the rear welding jaw $c^4$ is mounted a bracket $c^{14}$ upon the end of which is pivoted a hub $c^{15}$. $c^{16}$ is an arm connected to the hub $c^{15}$ formed in its lower end with a boss $c^{17}$, Fig. 19. $c^{18}$ represents a coiled spring one end of which is arranged in a suitable recess in the back side of a boss $c^{70}$ above the boss $c^{17}$; the other end of said spring being arranged in a complemental recess in a boss $c^{71}$ on the bracket arm $c^{14}$, the spring tending to throw the boss $c^{70}$ and the arm $c^{16}$ to the right in Fig. 19.

$c^{19}$ represents a screw-threaded bolt arranged in the boss $c^{17}$ and locked in position by a lock nut $c^{20}$. The bolt $c^{19}$ is formed with a head $c^{21}$ having a point $c^{22}$ adapted to pass the wires $r$ and $o$ and engage the fabric $s$ between it and a complemental member $c^{23}$ carried by a complemental member of a front welding jaw $c^5$. The complemental member $c^{23}$ and its mounting and its adjustability may be as in the Smith patent. The hub $c^{15}$ carries a horizontal arm $c^{24}$, the rear end of which is formed with a latch $c^{25}$. This latch is preferably hardened to prevent wear.

$c^{26}$ represents a hub at the end of an arm $c^{27}$ carried by the framework of the machine. The upper end of this hub is split and can be clamped together with a screw $c^{28}$. $c^{29}$ represents a bushing of insulating material arranged in the hub $c^{26}$, locked in place by the screw $c^{28}$. $c^{30}$ represents a copper rod arranged in the bushing $c^{29}$. $c^{31}$ represents a coil spring arranged in the bushing $c^{29}$ between the head of contact member $c^{12}$ of the rod $c^{30}$ and the wall at the end of the bushing $c^{29}$. $c^{32}$ are nuts on the end of the rod $c^{30}$ to adjust the pressure of the spring $c^{31}$ and keep the rod in place. In practice the terminal wire is clamped on the rod $c^{30}$ between the two nuts $c^{32}$. $c^{33}$ and $c^{33}$ represent two short rods with their ends secured in opposite walls of the bracket $c^{27}$. $c^{34}$, Fig. 20, represents a triangular-shaped bracket formed with three eyes, two of which are mounted on rods $c^{33}$, while in the other or top eye is arranged an insulating bushing $c^{35}$. In the latter bushing is a copper bolt $c^{36}$ held in place by a nut $c^{37}$. In practice a lead of the primary circuit is locked in place on the bolt $c^{36}$ by the nut $c^{37}$, and the inner end of the copper bolt $c^{36}$ is formed with an enlargement constituting one of the switches $c^{12}$.

The bracket $c^{34}$ between the rods $c^{33}$ is formed with a plate $c^{38}$ and at its inner end is shaped with a lip $c^{39}$ to co-act with the latch $c^{25}$. Between the upright part of the bracket $c^{27}$ and the plate $c^{38}$ and on each rod $c^{33}$ is arranged a coil spring $c^{40}$. The construction is such that when the two switches or contacts $c^{12}$ touch, as in Fig. 19, the primary circuit is closed and the springs $c^{40}$ are compressed so that when the latch $c^{25}$ is lifted out of engagement with the lip $c^{39}$, the springs $c^{40}$ will throw the contact head of the bolt $c^{36}$ instantly to the left away from the contact head $c^{12}$ of the bolt $c^{36}$ thus breaking the circuit.

The parts are so arranged that as the plunger carrying the rear welding jaw $c^5$ goes forward upon the softening of the metal at the weld, the point $c^{22}$ engages the complemental member $c^{23}$ forcing the arm $c^{16}$ to the left in Fig. 19, thus breaking the primary circuit. In Fig. 18 the welding jaws are shown in an open position and the contacts $c^{12}$ separated, this being the position occupied after a welding operation and during the feed of the material between the jaws.

In Fig. 19 the jaws $c^4$, $c^5$ are shown in contact with the work and the contacts $c^{12}$ touching.

In this arrangement the parts are in position for welding. As in the Smith machine the front welding jaw is the first to advance. Immediately thereafter the rear welding jaw engages the work, forces it against the front welding jaw putting the spring $c^{801}$, Fig. 18, under pressure just before the rear welding jaw $c^4$ reaches the limit of its forward motion. The bracket $c^{14}$ carrying the lever $c^{24}$ is secured to the plunger carrying the rear welding jaw $c^4$, Fig. 19, and as said plunger with its jaw $c^4$ moves forward the latch $c^{25}$ engages the lip $c^{39}$ pulling the left-hand contact $c^{12}$ in Fig. 19 against the right-hand contact $c^{12}$. The contacts $c^{12}$, $c^{12}$ are thus brought together and the primary circuit closed by the engagement of the latch $c^{25}$ with the lip $c^{39}$. As the material softens the front welding jaw $c^5$, due to the action of the spring $c^{801}$, is moved forward to upset the metal. The contacting parts $c^{22}$ and $c^{23}$ are so positioned that at a predetermined forward movement of the welding jaw $c^5$, due to the action of the spring $c^{801}$, the complemental member $c^{23}$ engages the point $c^{22}$ forcing the lower end of the arm $c^{16}$ inward, see Fig. 19, lifting the latch $c^{25}$ out of engagement with the lip $c^{39}$ and permitting the springs $c^{40}$ to throw the bolt $c^{36}$ and its contact head or switch $c^{12}$ away from the contact head or switch $c^{12}$ of the bolt $c^{36}$, thus breaking the primary circuit.

Referring to Fig. 21, the spring $c^{41}$ is for keeping the plunger roll $c^{42}$ in engagement with its particular cam $c^{13}$, it being understood that there is a cam $c^{13}$ for each plunger roll.

Referring to Figs. 22, 23, and 24, the stay wire receivers $c^{43}$, transfer fingers $c^{44}$, lever mechanisms $c^{45}$, $c^{46}$, $c^{47}$ and $c^{48}$ for operating the transfer fingers, are substantially the same as shown in the Smith patent and need no particular description. $c^{49}$ represents a shaft upon which the lever mechanism $c^{45}$ is mounted. $c^{50}$ represents studs, one upon each end of the machine, there being a lever $c^{46}$ mounted upon each stud as in the Smith patent. $c^{51}$ is a pitman connecting each lever $c^{46}$ to a yoke $c^{52}$ and adapted to be operated by cams $c^{53}$, $c^{54}$ upon the shaft $c$ as in the Smith patent. $c^{55}$ is a pitman connecting the lever $c^{48}$ that operates the transfer fingers $c^{44}$ to a yoke $c^{56}$, adapted to be operated by cams $c^{57}$, $c^{58}$ on the shaft $c$.

Referring to Fig. 32, $c^{59}$ represents a short shaft mounted in the frame of the machine, connected and driven by a pulley $c^{60}$ connected by a belt or otherwise to any source of power. $c^{61}$ represents a short shaft mounted in the machine carrying a gear $c^{62}$ meshing with a gear $c^{63}$ on the shaft $c^{59}$. $c^{64}$ represents a third short shaft mounted in the framework of the machine carrying a gear $c^{65}$ meshing with a gear $c^{66}$ on the shaft $c^{61}$. The shaft $c^{64}$ also carries a gear $c^{67}$ meshing with a gear $c^{68}$ on the shaft $c$. The foregoing gears are the means employed for connecting the power and the main driving shaft of the machine, all of the operating units of the machine taking their time and motion from this shaft $c$.

$c^{69}$ is a gear fast on the shaft $c$, Figs. 25 and 32, that meshes with and drives a gear $c^{70}$ mounted on a sleeve $c^{71}$ mounted on the shaft $c$. This intermittent set of gearing serves to operate the girt in the front of the machine that supports and carries the front welding jaws.

Referring to Figs. 27 and 32, $c^{72}$ represents a gear at each end of the shaft $c$. Each gear $c^{72}$ meshes with a gear $c^{73}$ on a shaft $c^{74}$ mounted in the framework of the machine. $c^{75}$ represents a gear on each shaft $c^{74}$ meshing with a gear $c^{76}$ on a short shaft $c^{77}$. $c^{78}$ represents a crank fast on the end of each shaft $c^{77}$ adapted to be connected to a rack $c^{80}$. $c^{79}$ represents a pitman connecting each crank $c^{78}$ to a rack $c^{80}$ which in turn meshes with and drives a pinion $c^{81}$ on a short shaft $c^{82}$, thereby driving the top stay wire feed rolls $c^{83}$, the stay wire being gripped between the driving roll $c^{83}$ and a lower roll $c^{84}$ mounted to turn upon bearings by reason of the pressure exerted by the roll $c^{83}$ and the stay wire $o$.

Upon each shaft $c^{74}$ is a cutter cam $c^{85}$. $c^{86}$ is a lever pivoted between its ends at $c^{87}$; one end of this lever carries a roll contacting with the cutter cam $c^{85}$; the opposite end of this lever is connected by a pitman $c^{88}$ to the upper end of a lever $c^{89}$ that operates the cutter slide $o^2$ against the stay wire $o$, against the stationary cutter $o^3$, all substantially as in the Smith patent.

Referring to Figs. 15, 16, 17 and 32, $c^{90}$ is a gear fast on the shaft $c$ meshing with a gear $c^{91}$ on a short shaft $c^{92}$. $c^{93}$ represents another gear fast on the shaft $c$, meshing with a gear $c^{94}$ on a short shaft $c^{95}$.

Referring to Figs. 17 and 32, upon the shaft $c^{95}$ is mounted a mutilated gear $c^{96}$ that meshes with a companion mutilated gear $c^{97}$ fast on a shaft $c^{98}$. $c^{99}$ represents another mutilated gear fast on the shaft $c^{98}$ and meshing with a complemental mutilated gear $c^{100}$ loosely mounted on a pin $c^{101}$. $c^{102}$ represents an eccentric loose on the opposite end of the pin $c^{101}$ from the gear $c^{100}$ and rigidly connected with the gear. Upon the eccentric $c^{102}$ is mounted a hub $c^{103}$ that carries an arm $c^{104}$ connected by a pitman $c^{105}$ to a crank $c^{106}$ fast on the shaft $c^{92}$. The hub $c^{103}$ also carries an arm $c^{107}$ connected by a pitman $c^{108}$ to a crank $c^{109}$ fast on a shaft $c^{110}$ in the framework in the top part of the machine above the plane of the welding devices, see Figs. 1, 2, 3, and 15. $c^{111}$ represents a drum loosely mounted on the shaft $c^{110}$ extending crosswise of the machine. Over this drum the fabric is fed, the surface of the drum serving to support the fabric against the driving action of the feed pawls hereafter described and to coöperate with said feed pawls in feeding the fabric.

Referring to Fig. 15, by reason of the action of the crank $c^{106}$ and the pitman $c^{108}$, a definite predetermined back and forth motion is given to the crank $c^{109}$, indicated by the full lines connected by arrows in the top of Fig. 15. This arc of motion of the crank $c^{109}$ is predetermined to correspond to the distance between the two stay wires $o$ for the regular feed of the machine, that is, during the making of the fabric. This fabric after being completed has to be cut up in lengths by means hereafter described. It is desirable to have a stay wire near each cut end of the completed fabric. If the fabric were fed forward with the uniform feed, this could not be done. The uniform feed of the fabric is taken care of by the normal action of the crank $c^{109}$; that is, the arm of motion of that crank is adjusted to feed the fabric forward, at each reciprocation, the desired distance between the stay wires. To provide for a stay wire at each end of the cut piece of the fabric it is necessary to modify the path of movement of the crank $c^{109}$ at predetermined times; that is, at a point corresponding to any length to which it is desired to cut the particular fabric being made. To secure this result the hub $c^{103}$ is shifted by the eccentric $c^{102}$ by means of the mutilated gears $c^{96}$, $c^{97}$, and $c^{99}$, $c^{100}$. When the point is reached in the operation of the machine corresponding to the desired length of the fabric, the parts described are so arranged that the hub $c^{103}$ is lifted in Fig. 15 from its normal position by means of the eccentric $c^{102}$.

In this position the crank $c^{109}$ instead of having its arc limited by the dot and dash lines in Fig. 15, operates in an arc indicated by the dotted lines in Fig. 15; this arrangement is such that the fabric instead of being fed forward a standard distance between the stay wires is only fed forward two inches for the next stay wire, or any distance that it may be desired to have between the stay wires where the cutting is to be done. Thereafter the regular feed is continued until the point is reached where it is desired to weld the stay wires more closely together for another cutting edge. The distance apart of the stay wires in the body of the fabric as well as the distance apart of the stay wires between which the fabric is to be cut can be regulated as desired by regulating the throw of the crank $c^{109}$, through the means I have described.

Referring to Fig. 3, $c^{112}$ represents an I-beam arranged over the drum $c^{111}$ running crosswise of the machine. Connected to this I-beam are two series of pawls $c^{113}$, $c^{114}$ adapted to engage the stay wires $o$ after the fabric has been fed forward and hold it from slipping back. Each of these pawls is spring-pressed against the fabric, thus after the stay wires drag under the pawls, the latter immediately snap back of the stay wires. These pawls shown are placed one in advance of the other; this distance is regulated to correspond to the distance desired between two stay wires between which the cut of the fabric is to be made. $c^{115}$ represents two arms; there is one of these arms rigidly attached to each end of the shaft $c^{110}$. This arm supports and carries a cross bar $c^{116}$, Fig. 13. These cross bars support and carry the feeding pawls. Upon each arm $c^{115}$ is pivoted a ratchet pawl $c^{117}$ engaging the teeth of a ratchet wheel $c^{118}$ fast upon each end of the drum $c^{11}$. Upon each end of the I-beam $c^{112}$ is pivoted a hold-back pawl $c^{119}$ adapted to engage the teeth of the ratchet wheel $c^{118}$ to hold it against a reverse motion. The pawls $c^{117}$ and $c^{119}$ serve respectively to feed and hold the feed of the drum. $c^{120}$ represents a series of spring-pressed feeding pawls connected to the rear side of the cross bar $c^{116}$, while $c^{121}$ represents a series of companion spring-pressed feed pawls carried by brackets $c^{122}$ connected to the cross bar $c^{116}$ and positioned a suitable distance in front of the pawls $c^{120}$ so that each of said pawls $c^{120}$, $c^{121}$ engages a stay wire $o$ in the normal operation of the machine. These pawls are substantially duplicates of each other to insure even feed of the fabric. The feeding pawls $c^{120}$, $c^{121}$ are spring-pressed so that as they are drawn to the right in Fig. 3, they will pass over a stay wire and as they are moved to the left in Fig. 3, they will snap down behind and feed forward the stay wire and the fabric. It is advisable to fashion the operating ends of the pawls $c^{120}$, $c^{121}$, $c^{113}$, $c^{114}$, as shown in Fig. 34, where in the front edge of the pawl it is cut away to form two fingers $c^{123}$ to engage the stay wire $o$ on each side of the strand wire $r$. The material of the dogs between the fingers $c^{123}$ is cut away on the bottom of the line indicated by $c^{124}$. This permits ample space for the strand wire $r$, and also permits the forming of the fingers $c^{123}$ with a sharp incline with a face $c^{125}$.

Referring to Fig. 3, $c^{126}$ represents a roll mounted in its ends in the framework of the machine above the drum $c^{111}$ and between the pawls $c^{120}$, $c^{114}$. The surface of this roll is adjusted in relation to the surface of the drum $c^{111}$ so as to permit the free passage of the fabric between the two rolls to prevent the fabric from leaving the surface of the drum or buckling. $c^{127}$ represents a second roll carried by arms $c^{128}$ connected to the framework of the machine. This roll is positioned back of the drum $c^{111}$ and further serves to keep the fabric against the drum to deflect it downward at this point toward the cutting mechanism. $c^{129}$ is a roll below the roll $c^{127}$ and on the opposite side of the fabric therefrom. The roll $c^{129}$ is carried by arms $c^{130}$ connected to the framework of the machine. The roll $c^{129}$ serves not only to guide the fabric but in conjunction with the roll $c^{127}$ gives the fabric predetermined paths, it being understood that this kind of fabric is relatively stiff.

Referring to Figs. 3, 13, 15, 16 and 17, the crank $c^{109}$ and the fabric-feeding and holding pawls as already stated during the normal feed of the fabric, the crank $c^{109}$ will reciprocate on a fixed arc represented for the purpose of illustration by the dot and dash arc in Fig. 15, and corresponding to the distance desired between the stay wires for the particular fabric being made. When a definite length of fabric has been welded, the eccentric $c^{102}$ shifts the hub $c^{103}$ upward, changing the arc of movement of the crank $c^{109}$ to that indicated by the dotted lines in Fig. 15. As shown the new arc or dotted arc has the same amplitude as the regular or full line arc, but is advanced. This advance considering the dot and dash line $c^{131}$ with relation to the top dotted line $c^{132}$ will correspond to the distance the next stay wire will be positioned on and welded to the strand wires; that is to say, the distance between these two arcs will correspond to the distance it is desired to have the stay wires positioned apart for a selvage. This distance as well as the distance or throw to the main feed can be varied as desired. After the eccentric $c^{102}$ has shifted the hub $c^{103}$ so that the crank $c^{109}$ operates in its advance arc at the first stroke the feed pawls, as will be evident from Fig. 15, will not be pulled back far enough to engage a fresh stay wire. In their forward motion, however, they will pick up the last stay wire and carry it and the fabric forward the distance corresponding to the distance between the line $c^{131}$ $c^{132}$. At the next stroke of the crank $c^{109}$ the pawls will engage a new wire and will continue to feed the fabric forward the standard distance, the same as when the hub $c^{103}$ is at its lowest point.

Referring to Figs. 12 and 15 and assuming that the fabric in Fig. 12 is fed in the direction of the arrow, this feeding forward by the crank $c^{109}$, the standard distance, in the advance arc, is continued until the stay wire $o$, Fig. 12, is fed forward by the pawls $c^{121}$. After this particular feeding step is completed the eccentric $c^{102}$ is operated dropping the hub $c^{103}$ and bringing not only the crank $c^{109}$ back to its regular position but also the arm $c^{115}$ and its pawls. At the next feeding stroke the pawls $c^{120}$ will engage the selvage stay wire that was welded to the fabric at the first feeding stroke of the crank $c^{109}$ after the hub was lifted, that is, the short feeding stroke of one, two or three inches, to provide room between the selvage stay wires for cutting, while the pawls $c^{121}$ will engage the wire to the front of said selvage wire, and the feeding thereafter will continue until the predetermined point is reached when another selvage wire should be applied. It will be understood that the backward motion of the cranks $c^{109}$ and the arms $c^{115}$ as well as the shifting motion of the eccentric $c^{102}$ takes place during the welding operations. Further, the parts are so timed that the eccentric $c^{102}$ is operated to lift or to lower the hub $c^{103}$ during the return stroke of the cranks $c^{109}$ and the arms $c^{115}$ with their pawls, it being understood that the cranks $c^{109}$ and arms $c^{115}$ are both fast on the shaft $c^{110}$, and any radial adjustment or movement of the crank $c^{109}$ produces an exactly equal adjustment or movement of the arm $c^{115}$.

$m$, see Fig. 1, represents a table or platform upon which the fabric is pushed after it passes the rolls $c^{127}$, $c^{129}$. At the rear end of this table $m$ is positioned a stationary cutting knife $m'$ over which the fabric passes. $m^2$ represents a sliding girt extending crosswise of the machine and confined to a vertical movement in fixed ways $m^3$. $m^4$ represents a knife secured to the lower side of the girt $m^2$ in a plane just to the rear of the knife $m'$ so that it can slide by but close to the latter. $m^5$ represents pitmen connected at their upper ends to the girt $m^2$ and at their lower ends to eccentric straps $m^6$ arranged on eccentrics $m^7$ fast on a shaft $m^8$. $m^9$ represents a gear fast on a shaft $m^{10}$. The shaft $m^{10}$ may be driven from any suitable source of power. The gear $m^9$ meshes with a gear $m^{11}$ loosely mounted on the shaft $m^8$, see Fig. 7. $m^{12}$ is a collar provided with a set-screw $m^{13}$ to secure the collar upon the shaft $m^8$ against the hub of the gear $m^{11}$ in order to position the hub of the gear $m^{11}$ against a hub $m^{14}$ keyed on the shaft $m^8$. $m^{15}$ represents a key arranged to slide in suitable ways or grooves in the periphery of the hub $m^{14}$. $m^{16}$ is a spring arranged between the stationary part of the hub $m^{14}$ and the rear end of the key $m^{15}$. $m^{17}$ is a hole in the hub of the gear $m^{11}$ adapted when the key $m^{15}$ is thrown to the left in Fig. 17 to receive the end of said key and thereby lock the gear $m^{11}$ to the shaft $m^8$ to drive the latter. The key $m^{15}$ is normally pressed to the left by the spring $m^{16}$ so that its end will be in the hole $m^{17}$ of the hub of the gear $m^{11}$ except when it is thrown out and held out by a cam $m^{18}$ carried by a pin $m^{19}$ arranged to slide in the end of a bracket $m^{20}$, see Fig. 1.

$m^{21}$ represents a lever pivoted between its ends to a bracket $m^{22}$. The rear end of this lever is pivoted to the lower end of the pin $m^{19}$; the front end of this lever is connected by a pitman $m^{23}$. $m^{24}$ represents a hub pivoted upon a stud $m^{25}$. An arm $m^{26}$ of the hub is pivoted to the upper end of the pitman $m^{23}$. Another arm $m^{27}$ of this hub is formed on its front end with a hook $m^{28}$, see Figs. 1 and 4, adapted to ride on the periphery of a cam $m^{29}$ fast on a shaft $m^{30}$. This cam $m^{29}$ is formed with a depression or cutaway part in its periphery $m^{31}$. This cam turns in the direction of the arrow. When the cutaway portion $m^{31}$ comes under the hook $m^{28}$, the latter drops and remains in its depressed position until it is raised by a shoulder $m^{32}$. The parts are so timed that the cutaway portion $m^{31}$ comes under the hook $m^{28}$ at the time when the wires $o$ of Fig. 12 would be on either side of the stationary knife $m'$. This is timed to occur during the welding operations when the fabric is stationary. By the dropping of the hook $m^{28}$ into the cutaway portion $m^{31}$ at this time through the operation of the arms $m^{27}$, $m^{26}$ and the lever $m^{21}$, the cam $m^{18}$ is drawn away from the key $m^{15}$ the latter slides into the hole $m^{17}$ as soon as the latter registers, the shaft $m^8$ is turned and the knife $m^4$ is drawn down across and cutting the fabric.

In order to adapt the cutter to any desired length of fabric or any desired spacing of stay wires, I provide the mechanism shown in detail in Figs. 4, 5, and 6.

$k$ represents an arm pivoted at one end upon a stud $k'$ on the framework. The free end of the arm $k$ is extended so that its free end $k^2$ is in position under the hook $m^{28}$ beside the cam $m^{29}$. As shown in Fig. 5 either the cam $m^{29}$ or the end $k^2$ of the arm $k$ will hold the hook $m^{28}$ in its raised position so that said hook cannot drop to operate the clutch until it is released both by the depression $m^{31}$ of the cam $m^{28}$ and by the end $k^2$ of the arm $k$.

Upon the shaft $m^{30}$, see Fig. 6, is a crank disk $k^3$. $k^4$ is a pitman connected at its lower end to the crank disk $k^3$ and at its upper end to a crank $k^5$ loosely mounted on a shaft $k^6$. The crank $k^5$ at its free end carries a pawl $k^7$ arranged to engage the teeth of a ratchet $k^8$ fast on the shaft $k^6$. As shown in Fig. 5, the shaft $k^6$ is mounted in a hub connected to the framework, with the parts just described upon the right side of said hub. Upon the shaft $k^6$ on the opposite side of a bracket hub $k^9$ from the ratchet $k^8$ are rigidly mounted two sprocket wheels $k^{10}$, $k^{10}$ see Figs. 5 and 4. The two sprocket wheels $k^{10}$ are formed with teeth, as shown in Figs. 4 and 5, properly spaced apart, and arranged to engage the sleeves $k^{12}$ mounted on a link pin $k^{13}$ of the sprocket chain upon each side of rollers $k^{14}$ in order to feed the chain or rollers evenly. As these rollers $k^{14}$ are fed forward by the movement of the chain they engage a block $k^{15}$ fast on the arm $k$.

$m^{33}$, Fig. 5, represents a gear wheel fast on the shaft $m^{30}$ and meshing with a gear $c^{91}$, see Fig. 32.

Referring to Figs. 5 and 6, the number of links $k^{16}$ will depend upon the number of stay wires desired for a particular piece of fabric. In the operation of this sprocket chain if each sleeve $k^{12}$ were equipped with a roller $k^{14}$, the block $k^{15}$ would be continuously held up and therefore the end $k^2$ would not drop far enough away from the hook $m^{28}$ to permit the latter to properly enter the cutaway portion $m^{31}$ as the succeeding roll engages the block before the preceding roll has left it.

In practice one of the rolls $k^{14}$ is omitted as shown in Fig. 6. When the sleeve thus not provided with a roll comes under the block $k^{15}$ the latter will drop and the end $k^2$ of the arm $k$ will drop away from the hook $m^{28}$. The parts are so timed that this will take place while the hook $m^{28}$ is still on the cam $m^{29}$. Immediately thereafter the hook $m^{28}$ will drop quickly over the sharp face $m^{34}$ of the front wall of the cutaway portion $m^{31}$ permitting the quick operation of the clutch. The cutter cannot operate except when the hook $m^{28}$ is released through the medium of the sprocket chain, but when such cutting operation takes place the hook $m^{28}$ will always be in the cutaway portion $m^{31}$. Whether said cutting operation takes place each time said cutaway portion comes under the hook or each second time, etc., depends upon the sprocket chain. The holding face of the cam $m^{29}$ serves to keep the hook $m^{28}$ and its arm raised and free from vibrations that might be imparted to it by the action of the rollers $k^{14}$ on the arm $k$. No motion would be imparted to the hook $m^{28}$ when over the cutaway portion $m^{31}$ because at that time the sprocket chain is stationary. The cam wheel $m^{29}$ serves not only as a means for quickly dropping the hook $m^{28}$, but also means for raising the hook and maintaining it in a definitely raised position until the sprocket chain releases the arm $k$. The cam $m^{29}$ not only serves as a means for holding the hook $m^{28}$ but for putting the spring $m^{35}$ under tension, one end of said spring being connected to the lever $m^{21}$ and the other to the framework of the machine. This spring serves to snap the hook $m^{28}$ quickly by the face $m^{34}$ and also to snap the cam $m^{18}$ quickly away from the key $m^{15}$.

While some parts of my improved machine are known, many parts are broadly new by themselves and also broadly new in their combination with the old features and I desire to claim said new features and new combinations in the broadest possible legal manner.

Having thus explained the nature and object of my invention and described a way of constructing and using the same although without attempting to set forth all of the forms in which it may be made or all of the modes of its use, what I claim and desire to secure by Letters Patent is:—

1. In a machine of the class described, means for feeding strand members, means for feeding stay members, means for feeding fabric between said members, means for forming cross rows of perforations in said fabric, means for welding the strand and stay members through said perforations, and means for changing the distance of travel of the fabric from the point of perforation to the point of welding.

2. In a machine of the class described, means for feeding strand members, means for feeding stay members, means for electrically welding said members at points of intersection, said first-mentioned means comprising a drum situated beyond the welding line and upon which the fabric rests, a shaft upon which said drum is rotatively mounted, an arm rigidly secured to each end of said shaft, a bar connecting the free ends of said arms over said fabric, a series of feeding pawls mounted on said bar one for each strand member, a ratchet wheel connected to the face of said drum, a feeding pawl upon said arm to engage said ratchet, means for reciprocating said shaft, a retaining pawl for the fabric, and a retaining pawl for the drum.

3. In a machine of the class described, means for feeding strand members, means for feeding stay members in position for welding, said first-mentioned feeding means including provision for feeding a fabric between the strand and stay members, means for forming perforations in said fabric, means for registering said perforations with the points of intersection of said strand and stay members at the welding line, and means for welding said members at said points of intersection through said perforations.

4. In a machine of the class described, means for feeding two sets of strand members, means for feeding a stay member for each set of strand members, and means for electrically welding said members at points of intersection comprising two independent transformers for each set of strand and stay members.

5. In a machine of the class described, means for feeding two sets of strand members, means for feeding a stay member for each set of strand members, means for electrically welding said members at points of intersection, comprising two independent transformers for each set of strand and stay members, and means for stopping the welding current at each weld upon a predetermined amount of upsetting motion of the welding members.

6. In an electric welding machine, means for feeding strand members, means for feeding stay members, means for feeding an interposed fabric between the stay members and strand members, means for welding said members at points of intersection through said interposed fabric, automatic means for cutting the product into predetermined lengths, comprising a cutter, a measuring device, means controlled by said measuring device for operating the cutter, and a timing device arranged to release the said last-mentioned means to the control of said measuring device.

7. In a machine of the class described, means for feeding strand members, means for feeding stay members, means for feeding fabric between said members, means for forming cross rows of perforations in said fabric, and means for welding the strand and stay members through said perforations.

8. In an electric welding machine, a plurality of pairs of welding jaws, means for operating the same, means for feeding stay wires, means for feeding strand wires, said means comprising a device situated in advance of the welding jaws for positioning the strand wires, a drum situated on the opposite side of the welding jaws from said device, means co-acting with the drum for engaging the welded stay members to pull the fabric forward, including the unwelded strand wires, the edge of said drum and said positioning device being located with reference to the welding jaws to properly position each strand member to be engaged by its complemental welding jaws.

9. In an electric welding machine, a plurality of welding jaws arranged upon one side of the plane of the work, a like number of welding jaws arranged upon the opposite side of the plane of the work, each of said last-mentioned jaws being opposite one of the first-mentioned jaws and constituting a pair, each pair of jaws being arranged to hold the work between them and effect a weld, means for feeding stay wires, means for feeding strand wires comprising a drum located beyond the welding line, a device co-acting with the drum for engaging a welded stay wire to pull the fabric forward over said drum including the unwelded strand wires, a controller normally acting to confine said device to operate over a predetermined sector of said drum corresponding to the normal feed desired of the fabric, and automatic means controlling the operation of said controller, said means being timed and arranged to cause the controller to operate to restrict said device to the sector of movement required for the normal feed of the fabric during a predetermined period, then to operate said controller to shift said device to a different sector of operation on said drum during a predetermined period and thereafter to operate the controller to shift said device to the first-mentioned sector of operation.

10. In an electric welding machine, a series of welding jaws arranged upon one side of the plane of the work, a complemental series of welding jaws arranged upon the opposite side of the plane of the work, the jaws upon one side of the plane of the work being positioned opposite the jaws upon the opposite side of the plane of the work, the two opposed welding jaws constituting a pair arranged to hold the work between them and effect a weld, means for operating said jaws, means for engaging a welded stay wire to feed the fabric forward and draw a strand wire in position between a pair of welding jaws, a pivoted arm for operating said means, an eccentric, a lever pivoted on said eccentric, connections between one arm of said lever and said pivoted arm, means for reciprocating the opposite end of said lever whereby a predetermined reciprocation is given to the first-named arm, and automatically-acting means for shifting said eccentric and its pivoted arm at predetermined times to change the operation of said arm from one predetermined arc to another predetermined arc.

11. In an electric welding machine, a series of welding jaws arranged upon one side of the plane of the work, a complemental series of welding jaws arranged upon the opposite side of the plane of the work, each pair of opposed jaws being constructed to operate to grasp the work and effect a weld, means for feeding stay wires, means for feeding a strand wire comprising an eccentric, a bell-crank mounted on said eccentric, a link connecting one arm of said bell-crank with said strand wire feeding means, means for reciprocating the opposite end of said bell-crank to reciprocate said first-mentioned means through a predetermined sector and by engaging a welded stay wire give to the fabric a predetermined feeding movement, a mutilated gear arranged to shift said eccentric, a complemental mutilated gear arranged to shift the eccentric gear, a second mutilated gear connected to the first-named mutilated gear, and a driving mutilated gear arranged to shift the last-mentioned mutilated gear whereby the position of said eccentric is shifted at predetermined times to change the arc in which said arm moves the devices that engage the stay wires to feed the fabric and strand wires.

12. In an electric welding machine, a movable welding jaw arranged upon one side of the plane of the work, a complemental yieldingly-mounted movable welding jaw arranged upon the opposite side of the plane of the work, a break switch, a movable part supported adjacent to said first-named jaw and arranged to move therewith, one end of said part co-acting with said switch, an adjustable work contact member carried by said part and adapted to contact with the work upon the same side thereof as said jaw, a complemental adjustable work contact member arranged upon the opposite side of the plane of the work and connected with the second-named or yieldingly-mounted jaw, the parts being arranged to cause said work contact members to lightly contact with the work upon the opposite sides thereof when the latter is clamped by said jaws and as the yielding jaw is forced forward on the softening of the metal the work contact member upon that side of the work operates its complemental opposed work contact member to operate the switch.

13. In a machine of the class described, means for feeding stay wires, means for feeding strand wires, means for feeding an interposed fabric between said wires, means for electrically welding said wires at their points of intersection through said interposed fabric, said means for feeding interposed fabric comprising a plurality of supports over which the fabric travels from a supply fabric roll to the welding point, a movable part arranged on the opposite side of said fabric from said supports, means for operating said part at the time of the weld for pulling off from the roll a predetermined partial supply whereby the yanking motion on the fabric supply roll due to the feeding action between the welding periods is modified.

14. In a machine for making wire fabric, means for feeding strand members, means for feeding stay members, means for bonding said members together at points of intersection, said first-mentioned means comprising co-acting devices to engage a bonded stay member to pull the fabric forward including the unbonded strand members, means for giving said devices their feeding action, a controller normally acting to confine one member of said device to operate in a predetermined zone corresponding to the normal feed desired for the fabric, and automatic means controlling the operation of said controller, said automatic means being timed and arranged to cause the controller to operate to restrict said member of said device to the sector of movement required for the normal feed of the fabric during a predetermined period, then to operate said controller to shift said member of said device to a different sector of operation during a predetermined period, and thereafter to operate the controller to shift the device to the first-mentioned sector of operation.

15. In a machine for making wire fabric, means for feeding strand members, means for feeding stay members, means for bonding said members together at points of intersection, said first-mentioned means comprising co-acting devices to engage a bonded stay member to pull the fabric forward including the unbonded strand members, means for giving said devices their feeding action, a controller normally acting to confine one member of said device to operate in a predetermined zone corresponding to the normal feed desired for the fabric, and automatic means controlling the operation of said controller, said automatic means being timed and arranged to cause the controller to operate to restrict said member of said device to the sector of movement required for the normal feed of the fabric during a predetermined period, then to operate said controller to shift said member of said device to a different sector of operation during a predetermined period.

16. In a machine for making wire fabric, means for feeding strand members, means for feeding stay members, means for bonding said members together at points of intersection, said first-mentioned means comprising co-acting devices to engage a bonded stay member to pull the fabric forward including the unbonded strand members, means for giving said devices their feeding action, a controller normally acting to confine one member of said device to operate in a predetermined zone corresponding to the normal feed desired for the fabric, automatic means controlling the operation of said controller, said automatic means being timed and arranged to cause the controller to operate to restrict said member of said device to the sector of movement required for the normal feed of the fabric during a predetermined period, then to operate said controller to shift said member of said device to a different sector of operation during a predetermined period, and automatical means for cutting the fabric into predetermined lengths.

In testimony whereof I have affixed my signature.

WILLIAM S. SOUTHWICK.